US011325449B2

United States Patent
Tabaru et al.

(10) Patent No.: US 11,325,449 B2
(45) Date of Patent: May 10, 2022

(54) SIDE VEHICLE-BODY STRUCTURE OF VEHICLE

(71) Applicant: MAZDA MOTOR CORPORATION, Hiroshima (JP)

(72) Inventors: Issei Tabaru, Aki-gun (JP); Daisuke Nakazato, Aki-gun (JP); Hideaki Fujii, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 45 days.

(21) Appl. No.: 16/995,595

(22) Filed: Aug. 17, 2020

(65) Prior Publication Data

US 2021/0061071 A1 Mar. 4, 2021

(30) Foreign Application Priority Data

Aug. 26, 2019 (JP) .............................. JP2019-153785

(51) Int. Cl.
*B60J 5/04* (2006.01)
*B62D 25/04* (2006.01)
(Continued)

(52) U.S. Cl.
CPC ........... *B60J 5/0423* (2013.01); *B60J 5/0425* (2013.01); *B60J 5/0427* (2013.01); *B60J 5/0429* (2013.01);
(Continued)

(58) Field of Classification Search
CPC ........ B60J 5/042; B60J 5/0422; B60J 5/0423; B60J 5/0427; B60J 5/0429; B60J 5/0433;
(Continued)

(56) References Cited

U.S. PATENT DOCUMENTS

2003/0006625 A1 1/2003 Moriyama et al.
2004/0080179 A1 4/2004 Okazaki et al.
(Continued)

FOREIGN PATENT DOCUMENTS

JP 2003025844 A 1/2003
JP 2005-153644 A 6/2005

OTHER PUBLICATIONS

The extended European search report issued by the European Patent Office dated Jan. 14, 2021, which corresponds to European Application No. 20190702.9-1015 and is related to U.S. Appl. No. 16/995,595.

*Primary Examiner* — Dennis H Pedder
(74) *Attorney, Agent, or Firm* — Studebaker & Brackett PC

(57) ABSTRACT

A side vehicle-body structure of a vehicle includes a rear door having a center pillar extending in a vehicle up-down direction built in a front portion of the rear door, and a front door having a door impact bar extending in a vehicle front-rear direction built in the front door. A rear end of the door impact bar is disposed to overlap with the center pillar in a vehicle side view, a reinforcement gusset that connects a lower portion of the front door and a rear portion of the door impact bar to each other is included in an inner portion of the front door, and a side sill extending in the vehicle front-rear direction is adjacently disposed below a connecting portion of a lower portion of the front door at which the lower portion of the front door is connected to the reinforcement gusset.

16 Claims, 8 Drawing Sheets

(51) Int. Cl.
*B62D 25/02* (2006.01)
*B62D 27/02* (2006.01)

(52) U.S. Cl.
CPC ........... *B60J 5/0444* (2013.01); *B60J 5/0479* (2013.01); *B62D 25/025* (2013.01); *B62D 25/04* (2013.01); *B62D 27/02* (2013.01)

(58) Field of Classification Search
CPC ..... B60J 5/0437; B60J 5/0443; B62D 25/024; B62D 25/04; B62D 25/025
USPC .................................. 296/146.5, 146.6, 209
See application file for complete search history.

(56) References Cited

U.S. PATENT DOCUMENTS

2004/0090087 A1* 5/2004 Kimura .................... B60J 7/022
                                                            296/203.03
2008/0007087 A1 1/2008 Endo

* cited by examiner

SIDE VEHICLE-BODY STRUCTURE OF VEHICLE

BACKGROUND

Technical Field

The present disclosure relates to a side vehicle-body structure of a vehicle including a center pillar extending in the vehicle up-down direction on the door side instead of the vehicle body side, and particularly to a side vehicle-body structure of a vehicle in which a center-pillar-less vehicle body includes a rear door having a center pillar built in a front portion thereof, and a front door having a door impact bar extending in the vehicle front-rear direction built therein.

Background Art

Openings for an occupant to get in and out are formed in a vehicle body side portion of the vehicle. A front door is included in the opening on the front side for an occupant on a front seat to get in and out in an openable and closeable manner, and a rear door is included in the opening on the rear side for an occupant on a rear seat to get in and out in an openable and closeable manner.

As the side vehicle-body structure of the vehicle as above, a side vehicle-body structure in which an opening on the front side and an opening on the rear side are separated from each other in the vehicle front-rear direction by disposing a center pillar extending in the vehicle up-down direction between the opening on the front side and the opening on the rear side so as to connect upper and lower edges of the openings is known.

Meanwhile, the side vehicle-body structures of the vehicle include a side vehicle-body structure in which the opening on the front side and the opening on the rear side are formed in a continuous manner in the vehicle front-rear direction without including a center pillar therebetween.

As exemplified in a door structure of a vehicle in Japanese Patent Laid-Open No. 2003-25844, in the latter side vehicle-body structure of the vehicle, a reinforcement member, in other words, a center pillar extending in the up-down direction is disposed on a front end of a rear door instead of including a center pillar on the vehicle body side. The latter side vehicle-body structure of the vehicle responds to a side collision by causing the center pillar to overlap with a rear end of a door impact bar disposed in the vehicle front-rear direction so as to serve as a bridge between both of front and rear ends of a front door in a vehicle side view.

However, in a structure including the center pillar on the door side instead of the vehicle body side as in the latter side vehicle-body structure of the vehicle, an overlapping amount by which the center pillar overlaps with the vehicle body in the vehicle side view in a door-closed state can only be secured within a range of the overlapping amount of the rear door itself with the vehicle body.

Therefore, in the latter side vehicle-body structure of the vehicle, the overlapping amount of the center pillar with the vehicle body when the rear door is closed is limited as compared to the former side vehicle-body structure of the vehicle including the center pillar on the vehicle body side, and there has been room for further improvement in terms of responding to a side collision.

Specifically, in the door structure of the vehicle in Japanese Patent Laid-Open No. 2003-25844 exemplified as the latter side vehicle-body structure of the vehicle, a lower portion of a side door is disposed on the vehicle-width-direction outer side so as to overlap with a side sill on the vehicle body side extending in the vehicle front-rear direction along a lower edge of the opening in the vehicle side view when the side door is closed. In the door structure of the vehicle in Japanese Patent Laid-Open No. 2003-25844, the overlapping amount of the center pillar included in the rear side door with the side sill is insufficient. Therefore, in the structure, the rear side door easily crosses over the side sill and enters the vehicle cabin from the opening for the occupant to get in and out at the time of a side collision, and there has been room for improvement.

SUMMARY

The present disclosure thus provides a side vehicle-body structure of a vehicle capable of preventing lower ends of doors (a rear door and a front door) from crossing over a side sill and entering the vehicle cabin at the time of a side collision.

The present disclosure is a side vehicle-body structure of a vehicle. The side vehicle-body structure includes a rear door having a center pillar extending in a vehicle up-down direction built in a front portion of the rear door, a front door having a door impact bar extending in a vehicle front-rear direction built in the front door, and a side sill disposed so as to overlap with a lower portion of the center pillar in a vehicle side view in a door-closed state along a lower edge of a door opening formed as an opening in a vehicle body side portion so as to be closable by the rear door and the front door. In the side vehicle-body structure, a rear end of the door impact bar is disposed so as to overlap with the center pillar in the vehicle side view, a reinforcement gusset that connects a lower portion of the front door and a rear portion of the door impact bar to each other is included in an inner portion of the front door, and the side sill is adjacently disposed below a connecting portion of the lower portion of the front door at which the lower portion of the front door is connected to the reinforcement gusset.

According to the abovementioned configuration, by causing the reinforcement gusset to function as a tension member that stretches between the rear portion of the door impact bar and the lower portion of the front door at the time of a side collision, the lower ends of the doors (the front door and the rear door) can be prevented from crossing over the side sill and entering the vehicle cabin.

As an aspect of the present disclosure, the vehicle has doors in a form of a clamshell door structure (center-opening doors) in which the front door is connected to a vehicle body at a front end portion of the front door via a hinge, the rear door is connected to the vehicle body at a rear end portion of the rear door via a hinge, and a front-rear length of the rear door is shorter than a front-rear length of the front door.

According to the abovementioned configuration, the center pillar built in the front end of the rear door is misaligned from the center of the door opening (opening), which is for the occupant to get in and out and is formed in the vehicle body side portion, in the vehicle front-rear direction to the rear side due to the front-rear length of the rear door being shorter than the front-rear length of the front door. However, the reinforcement gusset can make up for the negative effect at the time of a side collision due to the misalignment.

As an aspect of the present disclosure, the reinforcement gusset is provided such that an upper end side thereof is positioned on a vehicle outer side with respect to a lower end side thereof.

According to the abovementioned configuration, the side collision load toward the inside of the vehicle cabin is input to the doors at the time of a side collision. As a result, the door impact bar is pushed to the inside of the vehicle cabin. Therefore, the tension force of the reinforcement gusset against the door lower portion can be increased.

As an aspect of the present disclosure, the front door includes a door inner to which a rear end of the door impact bar is connected, and a connection reinforcement member that is interposed between the rear end of the door impact bar and the door inner and reinforces a connection section between the rear end of the door impact bar and the door inner. The door inner includes the lower portion of the door to which the reinforcement gusset is connected, the connection reinforcement member is extended to a connecting section of the lower portion of the front door at which the lower portion of the front door is connected to the reinforcement gusset, and the reinforcement gusset is connected to the lower portion of the front door via the connection reinforcement member.

According to the abovementioned configuration, the connection reinforcement member can be extended to the connecting section of the lower portion of the front door at which the lower portion of the front door is connected to the reinforcement gusset, the rigidity of the lower portion side of the front door itself to which the lower portion of the reinforcement gusset is connected can be increased, and the tension force of the reinforcement gusset can be improved.

As an aspect of the present disclosure, the reinforcement gusset includes a plurality of ridgeline portions extending in a longitudinal direction.

According to the abovementioned configuration, the rigidity against the tension can be increased by increasing the rigidity of the reinforcement gusset in the longitudinal direction by the ridgeline portions.

As an aspect of the present disclosure, the reinforcement gusset is formed such that a lower end thereof is positioned on a front side with respect to an upper end thereof.

According to the abovementioned configuration, as compared to when the reinforcement gusset is formed such that upper and lower ends thereof are in substantially same positions in the vehicle front-rear direction, for example, the lower portion of the reinforcement gusset can be connected to a position in the lower portion of the front door separated more from the center pillar to the front side.

As a result, the side collision load that is input to the inside of the vehicle cabin to be input to the rear portion of the door impact bar and the center pillar at the time of a side collision can be received in a wide area of the side sill.

As an aspect of the present disclosure, the door impact bar has a structure in which the rear end of the door impact bar overlaps with the center pillar lower portion in the vehicle side view.

According to the abovementioned configuration, (the length in the up-down direction of) the reinforcement gusset that connects the lower portion of the front door and the rear portion of the door impact bar to each other can be shortened, and the improvement of the flexural rigidity and the weight saving of the reinforcement gusset can be contributed to as a result.

According to the present disclosure, the lower ends of the doors (the rear door and the front door) can be prevented from crossing over the side sill and entering the vehicle cabin at the time of a side collision.

DETAILED DESCRIPTION

Figure 1:
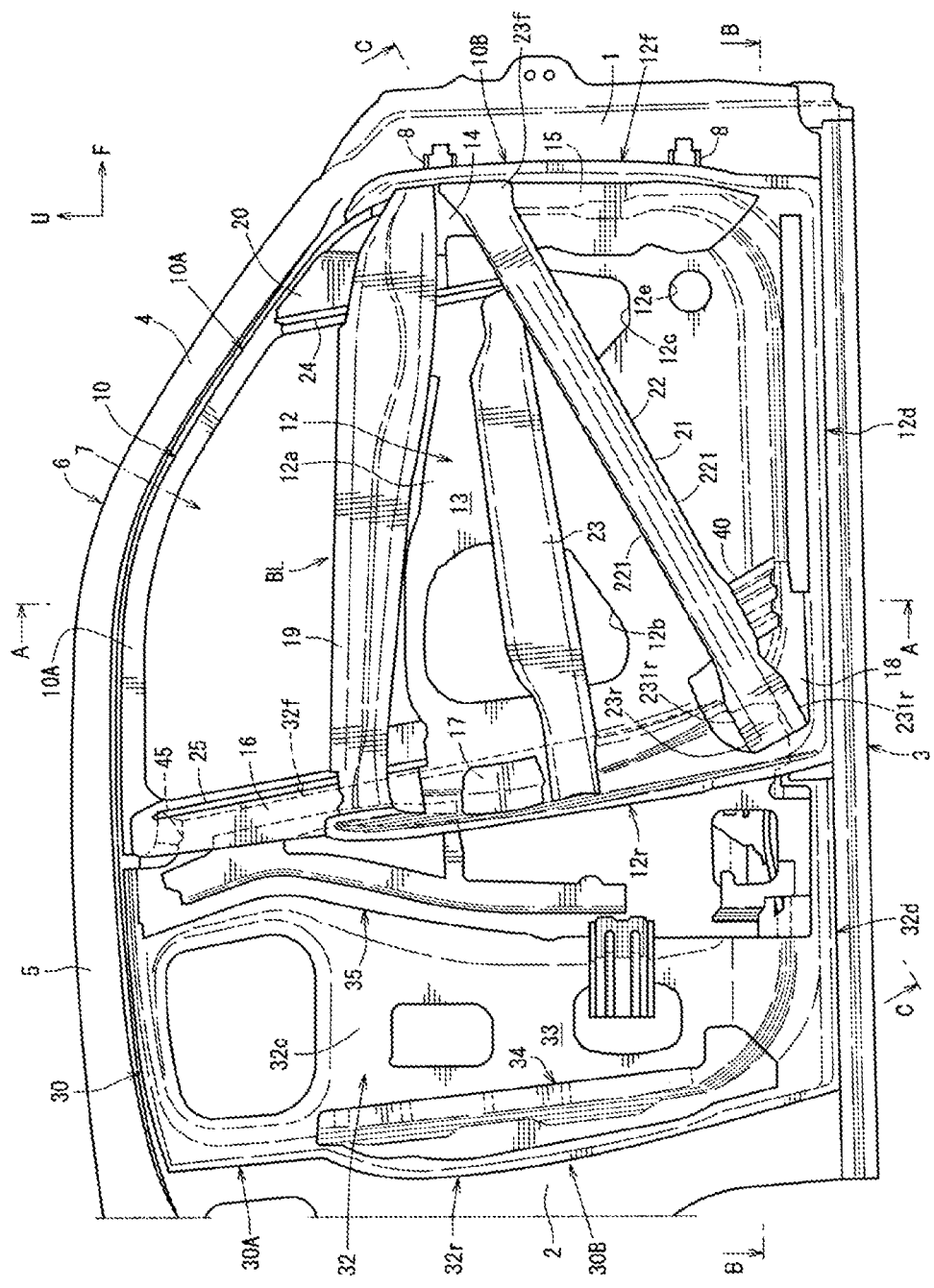
FIG. 1 is a side view illustrating a main part of a side vehicle-body structure of a vehicle of the present disclosure.

A side vehicle-body structure of a vehicle of an embodiment of the present disclosure is described with reference to FIG. 1 to FIG. 8.

In the drawings, arrow F indicates the vehicle front side, arrow U indicates the vehicle upper side, arrow R indicates the vehicle right side, arrow L indicates the vehicle left side, reference character OUT indicates the vehicle-width-direction outer side (outside of the vehicle cabin), and reference character IN indicates the vehicle-width-direction inner side (inside of the vehicle cabin).

Figure 2:
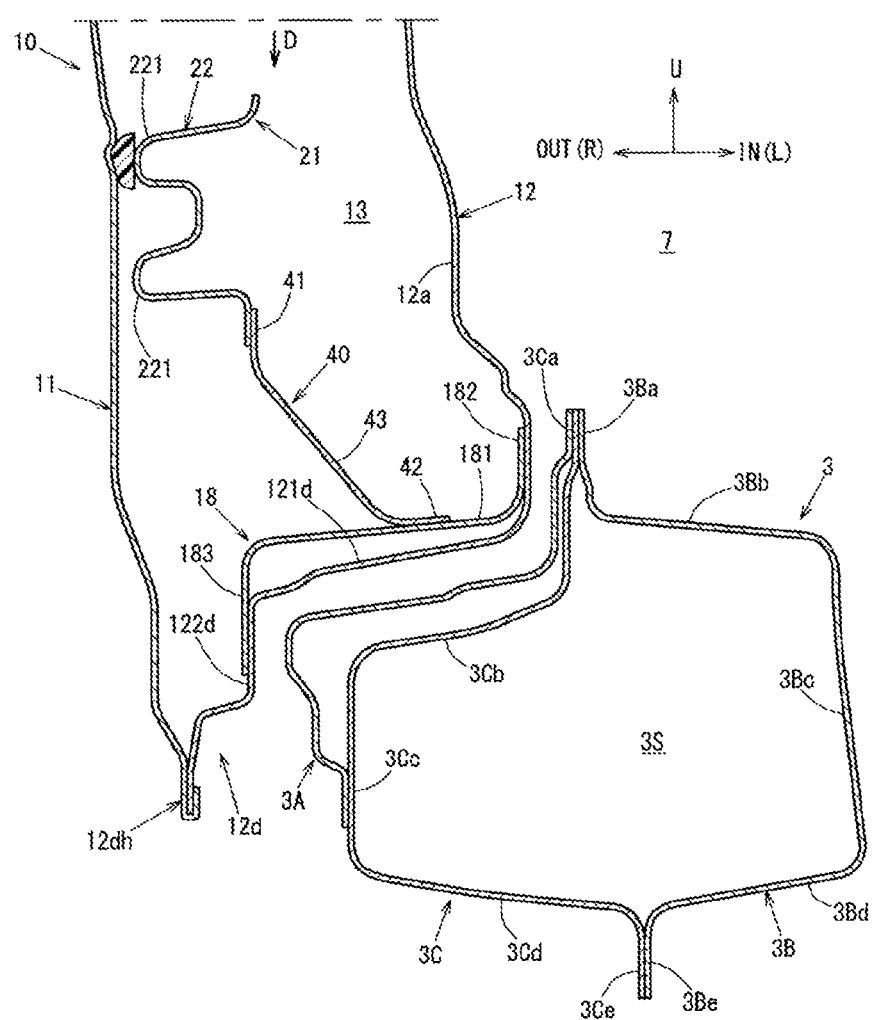
FIG. 2 is a main-part cross-sectional arrow view taken along line A-A in FIG. 1.
Figure 3:
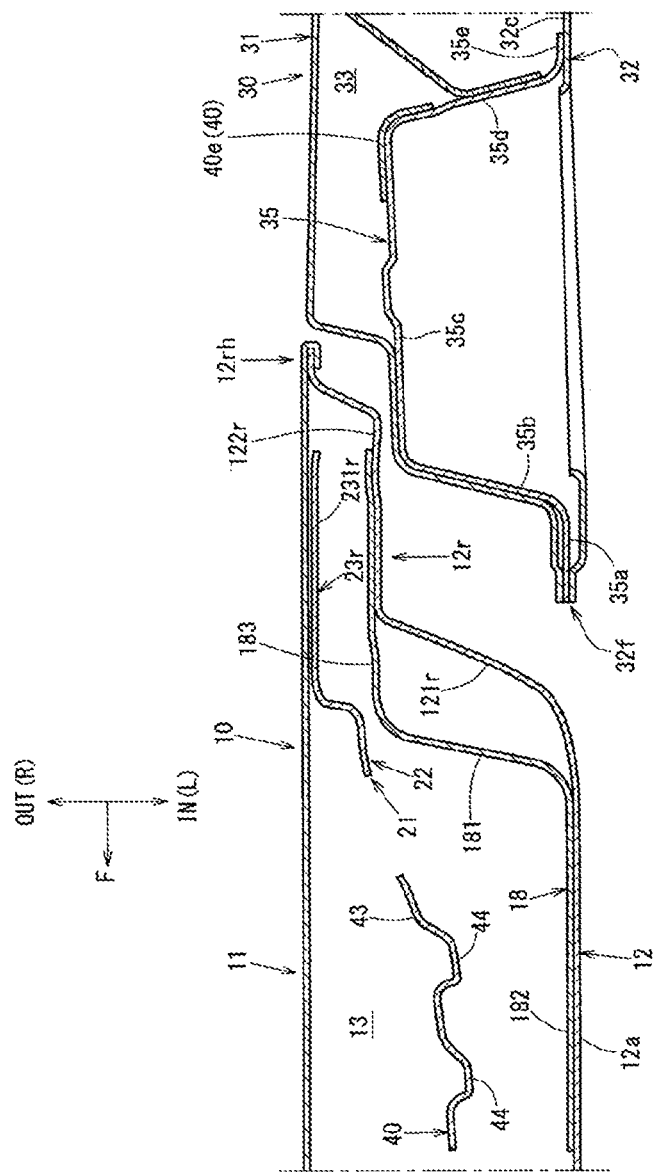
FIG. 3 is a main-part cross-sectional arrow view taken along line B-B in FIG. 1.
Figure 4:
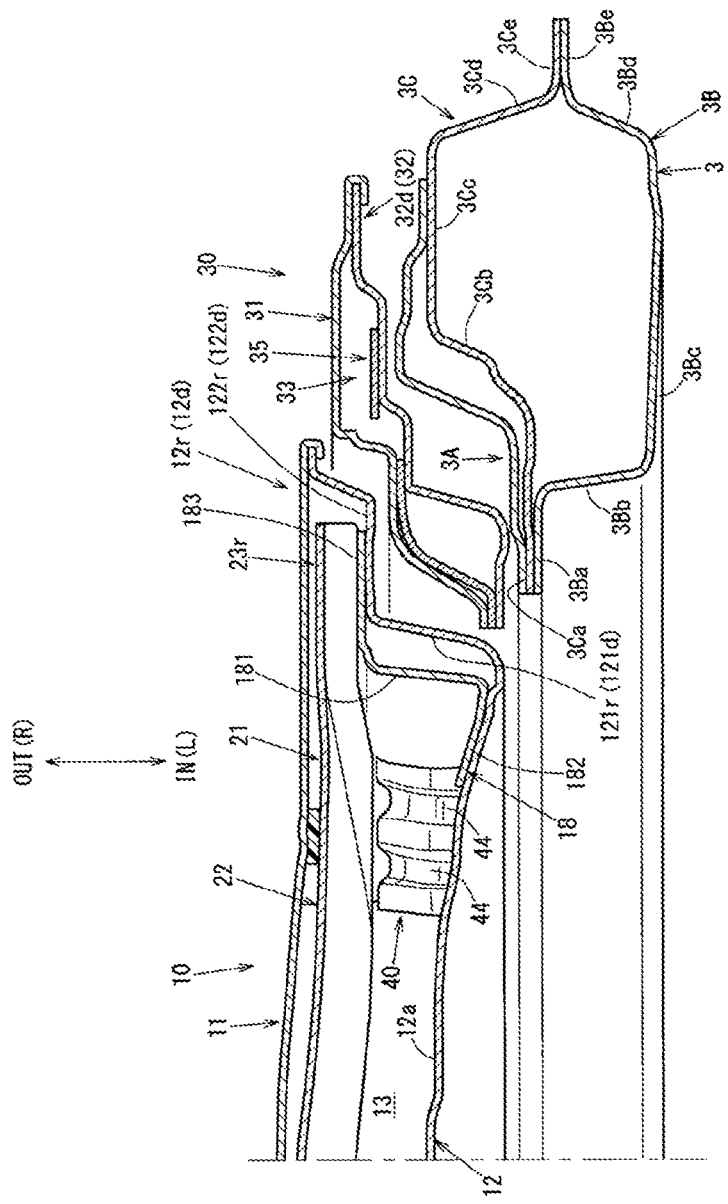
FIG. 4 is a main-part cross-sectional arrow view taken along line C-C in FIG. 1.
Figure 5:
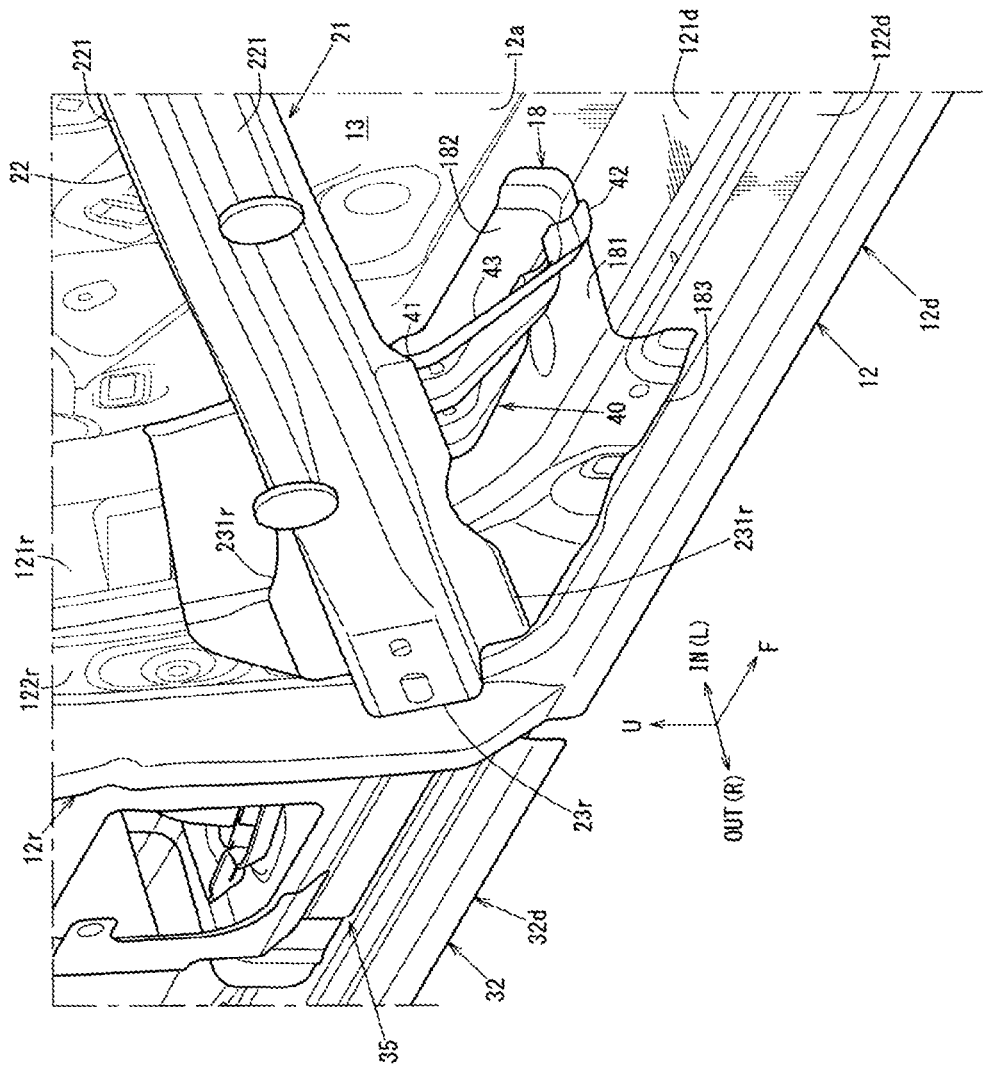
FIG. 5 is a main-part enlarged perspective view of a main part in FIG. 1 seen from the front side and the upper side.
Figure 6:
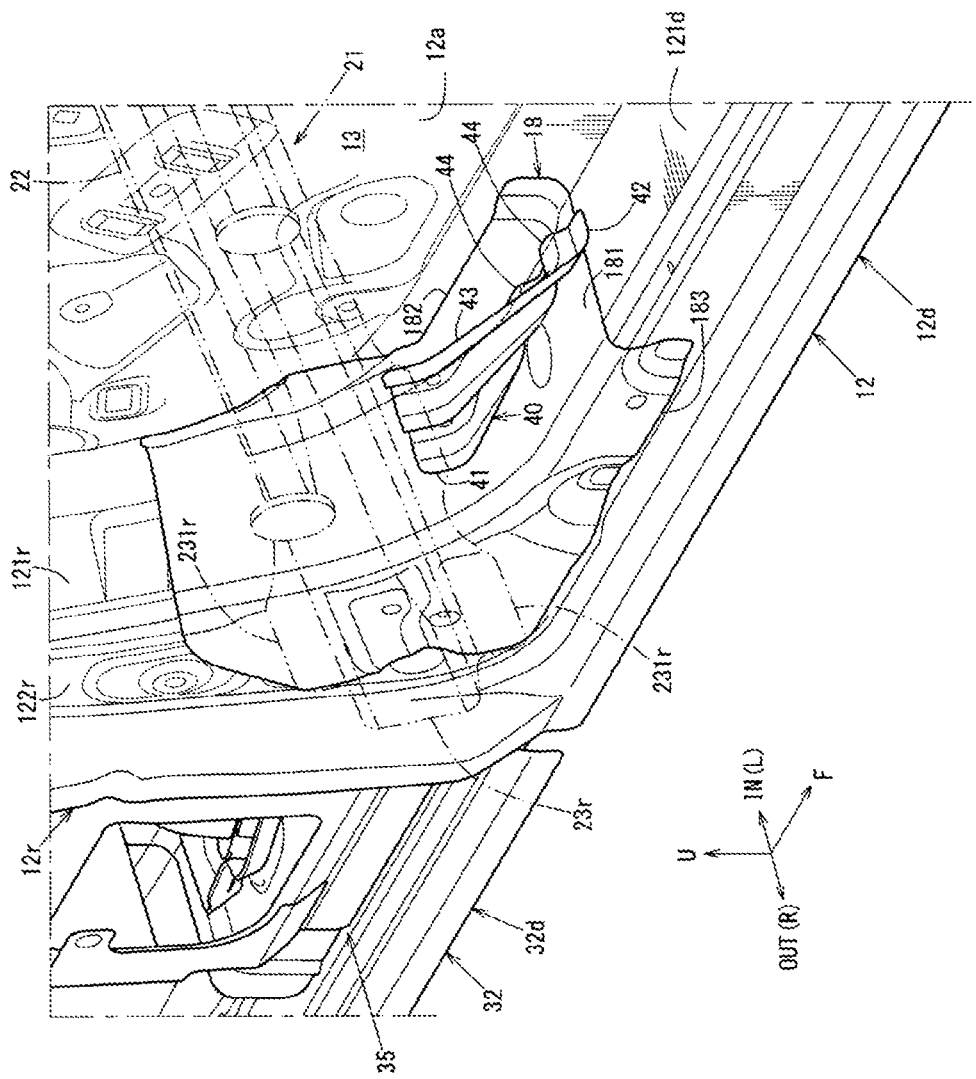
FIG. 6 is a main-part enlarged perspective view illustrating a door impact bar in FIG. 5 with virtual lines.
Figure 7:
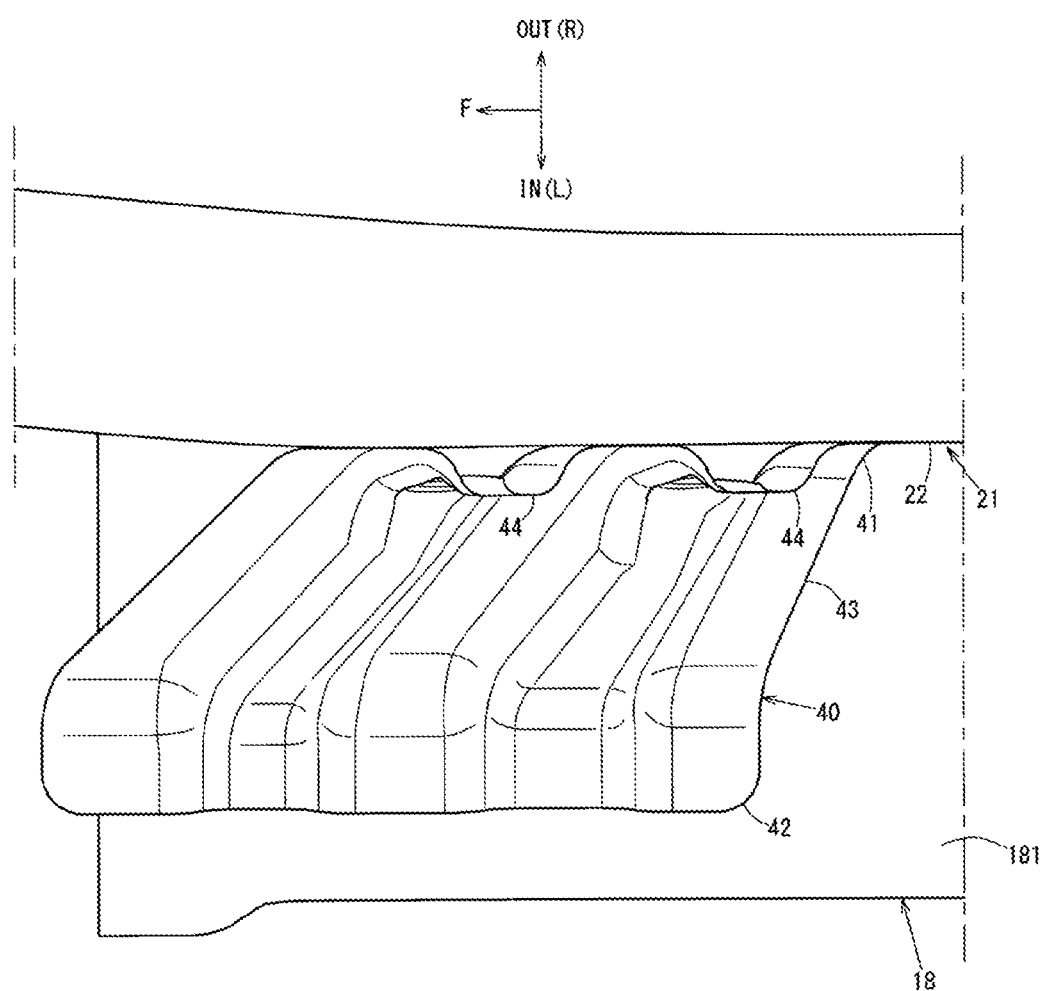
FIG. 7 is a main-part enlarged view illustrating a main part seen from arrow D in FIG. 2.
Figure 8A:
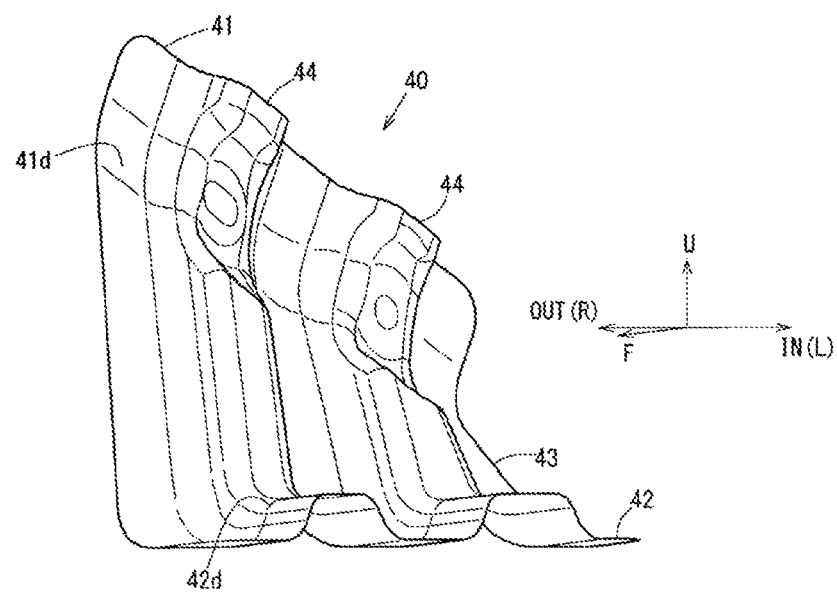
FIG. 8A includes a perspective view of a reinforcement gusset seen from the front side and the vehicle-width-direction inner side, and FIG. 8B includes a side view of the reinforcement gusset seen from the vehicle-width-direction outer side.
Figure 8B:
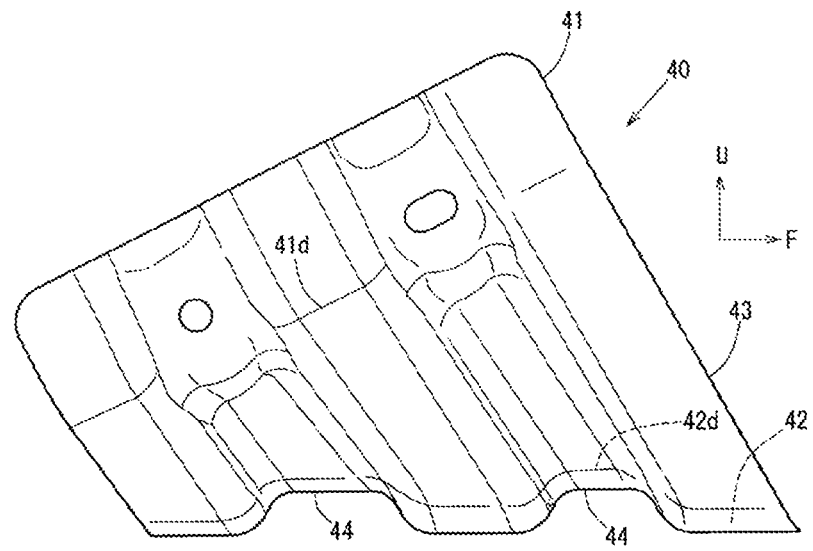

The drawings illustrate the side vehicle-body structure of the vehicle. FIG. 1 is a side view illustrating the side vehicle-body structure of the vehicle in a state in which a door outer panel is removed and seen from the vehicle-width-direction outer side, FIG. 2 is a main-part cross-sectional arrow view taken along line A-A in FIG. 1, FIG. 3 is a main-part cross-sectional arrow view taken along line B-B in FIG. 1, FIG. 4 is a main-part cross-sectional arrow view taken along line C-C in FIG. 1, FIG. 5 is a main-part enlarged perspective view of the periphery of a lower rear portion of a front door in FIG. 1 seen from the front side and the upper side, FIG. 6 is a main-part enlarged perspective view illustrating a door impact bar in FIG. 5 with virtual lines, FIG. 7 is a main-part enlarged view illustrating only the door impact bar, a connection reinforcement member, and a reinforcement gusset seen from arrow D in FIG. 2, FIG. 8A is a perspective view of the reinforcement gusset seen from the front side and the vehicle-width-direction inner side, and FIG. 8B is a side view of the reinforcement gusset seen from the vehicle-width-direction outer side.

As illustrated in FIG. 1, in a side portion on the body side, a hinge pillar 1 on the front side, a hinge pillar 2 on the rear side, a side sill 3, a front pillar 4, and a roof side rail 5 form an annular structure 6, and a center-pillar-less vehicle body in which a center pillar does not exist on the body side is formed. In the side portion on the body side, a door opening 7 surrounded by the abovementioned portions, in other words, the hinge pillars 1 and 2, the side sill 3, the front pillar 4, and the roof side rail 5 is formed.

The hinge pillar 1 on the front side is a vehicle body rigid member having a hinge pillar closed cross-section extending in the vehicle up-down direction obtained by joining a hinge pillar outer and a hinge pillar inner to each other. As illustrated in FIG. 1, the side sill 3 is a vehicle body rigid member obtained by connecting lower portions of the front and rear hinge pillars 1 and 2 to each other. As illustrated in FIG. 2, the side sill 3 has a side sill closed cross-section 3S extending in the vehicle front-rear direction obtained by joining a side sill outer portion 3A, a side sill inner portion 3B, and a side sill reinforcement 3C to each other.

The side sill outer portion 3A is joined to the side sill reinforcement 3C so as to cover the side sill reinforcement 3C from the vehicle-width-direction outer side and forms a design surface of the side sill.

The side sill inner portion 3B has a cross section orthogonal to the vehicle front-rear direction that is formed to have a hat-shaped profile opened toward the vehicle-width-direction outer side by an upper end flange 3Ba, an upper wall 3Bb extending from a lower end of the upper end flange 3Ba to the vehicle-width-direction inner side, a vehicle-width inner wall 3Bc extending downward from a vehicle-width-direction inner end of the upper wall 3Bb, a lower wall 3Bd extending from a lower end of the vehicle-width inner wall 3Bc to the vehicle-width-direction outer side, and a lower end flange 3Be extending downward from a vehicle-width outer end of the lower wall 3Bd.

The side sill reinforcement 3C has a cross section orthogonal to the vehicle front-rear direction that is formed to have a hat-shaped profile opened toward the vehicle-width-direction inner side by an upper end flange 3Ca, an upper wall 3Cb extending from a lower end of the upper end flange 3Ca to the vehicle-width-direction outer side, a vehicle-width outer wall 3Cc extending downward from a vehicle-width-direction outer end of the upper wall 3Cb, a lower wall 3Cd extending from a lower end of the vehicle-width outer wall 3Cc to the vehicle-width-direction inner side, and a lower end flange 3Ce extending downward from a vehicle-width inner end of the lower wall 3Cd.

The side sill closed cross-section 3S is included between the side sill inner portion 3B and the side sill reinforcement 3C.

As illustrated in FIG. 1, the front pillar 4 is a vehicle body rigid member diagonally extending to the rear side and the upper side from a front portion to a rear portion thereof by connecting an upper end of the hinge pillar 1 on the front side and a front end of the roof side rail 5 to each other. The front pillar 4 has a front pillar closed cross-section diagonally extending obtained by joining a front pillar outer and a front pillar inner to each other.

The roof side rail 5 is a vehicle body rigid member connecting a rear end of the front pillar 4 and a rear pillar portion front end (not shown) to each other in the vehicle front-rear direction. The roof side rail 5 has a roof side rail closed cross-section extending in the vehicle front-rear direction obtained by joining a roof side rail outer portion and a roof side rail inner portion to each other. As illustrated in FIG. 1, on the door opening 7, a front door 10 and a rear door 30 in a form of a clamshell door structure are provided.

The front door 10 is formed such that the rear side of the front door 10 opens and closes in a manner in which a door front end portion serves as a fulcrum via a pair of upper and lower hinge brackets 8, 8 provided on the hinge pillar 1. The rear door 30 is formed such that the front side of the rear door 30 opens and closes in a manner in which a door rear end portion serves as a fulcrum via a hinge bracket (not shown) provided on the hinge pillar 2 on the rear side. The front door 10 and the rear door 30 in the form of a clamshell door structure are formed such that the front door 10 is opened in preference to the rear door 30. In this embodiment, the front door 10 is formed such that the front-rear span thereof is longer than that of the rear door 30.

The structure of the rear door 30 is described with reference to FIG. 1, FIG. 3, and FIG. 4.

As illustrated in FIG. 1, the rear door 30 (however, the door on the vehicle right side is illustrated in the drawings) includes a door sash portion 30A and a door body 30B.

As illustrated in FIG. 3 and FIG. 4, the rear door 30 includes a door inner panel 32 made of a steel plate and provided so as to be recessed in the vehicle width direction, and a door outer panel 31 made of a steel plate and provided so as to face the door inner panel 32, and both of those panels 31 and 32 are integrated by hemming joining as illustrated in FIG. 4.

The door outer panel 31 is disposed on the outside of the vehicle cabin to form a design surface of the rear door 30. Meanwhile, as illustrated in FIG. 1, the door inner panel 32 includes an outer panel main plate portion 32c, a front edge portion 32f extending from a front portion of the outer panel main plate portion 32c to the vehicle-width-direction outer side, a lower edge portion 32d extending from a lower portion of the outer panel main plate portion 32c to the vehicle-width-direction outer side, and a rear edge portion 32r extending from a rear portion of the outer panel main plate portion 32c to the vehicle-width-direction outer side.

As illustrated in FIG. 1, FIG. 3, and FIG. 4, in the rear door 30, the door inner panel 32 is disposed closer to the inside of the vehicle cabin than the door outer panel 31, and a door inner space 33 is formed between both panels 31 and 32.

As illustrated in FIG. 1, the rear door 30 is supported by the hinge pillar 2 on the vehicle body side in an openable and closeable manner via a pair of upper and lower hinge brackets (not shown) at the rear edge portion 32r.

As illustrated in FIG. 1, in the door inner panel 32 at the rear edge portion 32r, a hinge reinforcement 34 extending in the up-down direction is provided. As illustrated in FIG. 1, FIG. 3, and FIG. 4, a center pillar 35 (the same meaning as a vertical reinforcement) on the door side is built in a front portion of the rear door 30 such that a front end thereof is along the front edge portion 32f.

As illustrated in FIG. 1, the center pillar 35 is a pillar member extending from a front-side upper end portion of the door sash portion 30A to the lower edge portion 32d in the up-down direction.

In detail, as illustrated in FIG. 1, an upper end of the center pillar 35 overlaps with the roof side rail 5 extending in the vehicle front-rear direction along an upper edge of the door opening 7 in a vehicle side view in a door-closed state. However, the upper end of the center pillar 35 is positioned to be slightly closer to the lower side than the upper end of the rear door 30, and hence overlaps with the roof side rail 5 within a range in which the rear door 30 overlaps with the roof side rail 5 in the vehicle side view when being closed.

Meanwhile, as illustrated in FIG. 1, a lower end of the center pillar 35 overlaps with the side sill 3 extending in the vehicle front-rear direction along a lower edge of the door opening 7 in the vehicle side view in the door-closed state. However, the lower end of the center pillar 35 is positioned to be slightly closer to the upper side than a lower end of the rear door 30, and hence overlaps with the side sill 3 within a range in which the rear door 30 overlaps with the side sill 3 in the vehicle side view when being closed.

As illustrated in a cross-sectional view in FIG. 3, the center pillar 35 is formed to have a hat-shaped profile in a horizontal cross-section by integrally forming a joining flange portion 35a on the front side, a front wall portion 35b, an outer wall portion 35c, a rear wall portion 35d, and a joining flange portion 35e on the rear side.

As illustrated in FIG. 1, the center pillar 35 is formed such that the length on the upper portion side in the front-rear direction is shorter than the length on the lower portion side in the front-rear direction, but the center pillar 35 is formed to have a cross-sectional hat-shaped profile from the upper portion side to the lower portion side except for both of upper and lower end portions thereof.

As illustrated in FIG. 3, the front and rear joining flange portions 35a and 35e of the center pillar 35 extend in the front-rear direction, and each of the joining flange portions 35a and 35e is joined and fixed to the door inner panel 32.

The front wall portion 35b extends from a rear end of the joining flange portion 35a to the vehicle-width-direction outer side. Similarly, the rear wall portion 35d extends from a front end of the joining flange portion 35e to the vehicle-width-direction outer side. The outer wall portion 35c extends between vehicle-width-direction outer ends of the front wall portion 35b and the rear wall portion 35d in the front-rear direction and connects the vehicle-width-direction outer ends to each other.

As described above, the front door 10 is formed such that the front-rear span thereof is longer than that of the rear door 30. Therefore, as illustrated in FIG. 1, the center pillar 35 built in the front portion of the rear door 30 is disposed to be closer to the rear side than an intermediate position of the door opening 7 in the vehicle front-rear direction.

Next, as illustrated in FIG. 1, the front door 10 (however, the door on the vehicle right side is illustrated in the drawings) includes a door sash portion 10A and a door body 10B.

The front door 10 includes a door inner panel 12 made of a steel plate and provided so as to be recessed to the vehicle width direction, and a door outer panel 11 made of a steel plate and provided so as to face the door inner panel 12 (see FIG. 2 to FIG. 4), and both of the panels 11 and 12 are integrated by hemming joining as illustrated in FIG. 2 to FIG. 4.

As illustrated in FIG. 1, the door inner panel 12 includes an inner panel main plate portion 12a in which a plurality of openings 12b, 12c, and 12e are formed, a front edge portion 12f extending from a front portion of the inner panel main plate portion 12a to the vehicle-width-direction outer side, a lower edge portion 12d extending from a lower portion of the inner panel main plate portion 12a to the vehicle-width-direction outer side, and a rear edge portion 12r extending from a rear portion of the inner panel main plate portion 12a to the vehicle-width-direction outer side.

The door outer panel 11 is disposed on the outside of the vehicle cabin to form a design surface of the front door 10 by being. As illustrated in FIG. 2 to FIG. 4, a door inner space 13 is formed between the door outer panel 11 and the door inner panel 12 disposed closer to the inside of the vehicle cabin than the door outer panel 11.

The door inner panel 12 forms a bottom surface of the door inner space 13 by the lower edge portion 12d as illustrated in FIG. 2 and forms a rear surface of the door inner space 13 by the rear edge portion 12r as illustrated in FIG. 3.

Specifically, the lower edge portion 12d extends in the vehicle front-rear direction along a lower edge of the door inner panel 12 as illustrated in FIG. 1, and is integrally formed by a lower edge portion base wall 121d substantially horizontality extending in a step-like form from a lower end of the vertical-wall-shaped inner panel main plate portion 12a to the vehicle-width-direction outer side and a lower edge portion vehicle-width outer wall 122d extending downward in a protruding shape from a vehicle-width outer end of the lower edge portion base wall 121d as illustrated in FIG. 2.

The lower edge portion base wall 121d has a panel-like shape having a thickness in the vehicle up-down direction and forms a lower surface portion of the front door 10.

The lower edge portion vehicle-width outer wall 122d has a panel-like shape having a thickness in the vehicle width direction, and a lower end of the lower edge portion vehicle-width outer wall 122d is hemming-joined to a lower end of the door outer panel 11. As a result, a lower end hem portion 12dh is formed on a lower end portion of the front door 10 (see FIG. 2).

The lower portion of the front door 10 including the lower edge portion 12d of the door inner panel 12 is formed so as to overlap with the side sill 3 from the vehicle-width-direction outer side in the vehicle side view in a door-closed state.

Specifically, as illustrated in FIG. 2, a lower portion of the inner panel main plate portion 12a of the door inner panel 12 is disposed on the vehicle-width-direction outer side with respect to the upper end flanges 3Ba and 3Ca of the side sill 3 in the door-closed state and is adjacent to and spaced apart from the upper end flanges 3Ba and 3Ca in the vehicle width direction.

As illustrated in FIG. 2, the lower edge portion base wall 121d of the door inner panel 12 is disposed on the upper side with respect to the upper wall 3Cb of the side sill reinforcement 3C in the door-closed state and is adjacent to and spaced apart from in the upper wall 3Cb in the up-down direction.

The lower portion of the front door 10 and the side sill 3 extend along the vehicle front-rear direction while both spaces described above are maintained as substantially fixed spaces.

As illustrated in FIG. 2, a lower end portion of the door inner panel 12 extends so as to protrude downward than the upper wall 3Cb of the side sill reinforcement 3C, and the lower edge portion 12d almost entirely overlaps with the side sill 3 in the vehicle side view in the door-closed state.

The rear edge portion 12r extends in the vehicle up-down direction along a rear end of the door inner panel 12 as illustrated in FIG. 1, and is integrally formed by a rear edge portion base wall 121r substantially horizontality extending in a step-like form from a rear end of the vertical-wall-shaped inner panel main plate portion 12a to the vehicle-width-direction outer side, and a rear edge portion vehicle-width outer wall 122r extending from a vehicle-width outer end of the rear edge portion base wall 121r to the vehicle rear side in a protruding shape as illustrated in FIG. 3.

The rear edge portion base wall 121r has a panel-like shape having a thickness in the vehicle front-rear direction and forms a rear surface portion of the front door 10.

The rear edge portion vehicle-width outer wall 122r has a panel-like shape having a thickness in the vehicle width direction, and a rear end of the rear edge portion vehicle-width outer wall 122r and a rear end of the door outer panel 11 are hemming-joined to each other as described above. As a result, a rear end hem portion 12rh is formed on a rear end portion of the front door 10.

As illustrated in FIG. 3, a rear portion of the front door 10 including the rear edge portion 12r of the door inner panel 12 is formed so as to overlap with a front portion of the center pillar 35 built in the front portion of the rear door 30 from the vehicle-width-direction outer side in the vehicle side view in the door-closed state.

As illustrated in FIG. 1, in the front door 10, the front edge portion 12f of the door inner panel 12 is supported by the hinge pillar 1 on the vehicle body side in an openable and closeable manner via the pair of upper and lower hinge brackets 8, 8.

At the front edge portion 12f of the front door 10, an upper hinge reinforcement 14 is provided on a place in the door inner panel 12 corresponding to the hinge bracket 8 on the upper side out of the pair of upper and lower hinge brackets 8, 8.

Similarly, at the front edge portion 12f of the front door 10, a lower hinge reinforcement 15 is provided on a place in the door inner panel 12 corresponding to the hinge bracket 8 on the lower side out of the pair of upper and lower hinge brackets 8, 8.

As illustrated in FIG. 1, a reinforcement 16 extending in the up-down direction from the door inner panel 12 at the upper side of the rear edge portion 12r of the front door 10 to a rear piece portion of the door sash portion 10A is provided. A latch reinforcement 17 is provided on the door inner panel 12 at an intermediate portion of the rear edge portion 12r in the up-down direction.

As illustrated in FIG. 1, on the door inner panel 12, a beltline reinforcement 19 extending in the front-rear direction along a beltline portion BL is provided.

The beltline reinforcement 19 is extended between the upper hinge reinforcement 14 and a lower portion of the reinforcement 16.

As illustrated in FIG. 1, a stiffener 23 diagonally extending in the front-rear direction in a front-high rear-low shape is provided between a place between a front portion of the beltline reinforcement 19 and a front portion of a door impact bar 21, and a portion of the rear edge portion 12r directly below the latch reinforcement 17. The stiffener 23 is in abutment with the door outer panel 11 via a sponge member and a urethane material, and the tensile rigidity of the door outer panel 11 is secured by the stiffener 23.

As illustrated in the same drawing, glass guides 24 and 25 are attached to both of a bracket 20 and the reinforcement 16. A window glass is guided to be raised and lowered along the pair of front and rear glass guides 24 and 25.

At a place in the door inner panel 12 below the beltline reinforcement 19, the door impact bar 21 extending in the vehicle front-rear direction is included so as to connect the front edge portion 12f and the rear edge portion 12r to each other.

The door impact bar 21 includes a bar body 22 linearly extending to be inclined in a front-high rear-low shape such that a front portion thereof is positioned on the upper side with respect to a rear portion thereof in the up-down direction, and wide connection portions 23f and 23r (a front wide connection portion 23f and a rear wide connection portion 23r) connected to the side of the door inner panel 12 at both of front and rear ends.

The wide connection portions 23f and 23r on the front and rear sides are formed to be wider than the bar body 22.

Out of the wide connection portions 23f and 23r on the front and rear sides, a cross section of the rear wide connection portion 23r orthogonal to the extending direction of the door impact bar 21 is formed to have a cross-sectional hat-shaped profile opened toward the vehicle-width-direction inner side. Flange portions 231r and 231r are formed on both outer sides of the rear wide connection portion 23r having a cross-sectional hat-shaped profile in the width direction, and the flange portions 231r and 231r are connected to a lower portion of the rear edge portion 12r (in other words, a corner portion between the rear edge portion 12r and the lower edge portion 12d) from the vehicle-width-direction outer side via a connection reinforcement member 18 described below.

As illustrated in FIG. 3 and FIG. 4, the door impact bar 21 is disposed on the vehicle-width outer side with respect to the center pillar 35 in the door-closed state, and at least a part of the rear wide connection portion 23r of the door impact bar 21 overlaps with a lower portion of the center pillar 35 in the vehicle side view.

As illustrated in FIG. 1 and FIG. 2, on the door impact bar 21, a plurality of (two in this example) beads 221 (ridgelines) extending in a continuous manner along the extending direction are formed, and the rigidity of the door impact bar 21 itself against an input load applied toward the inside of the vehicle cabin mainly at the time of a side collision is increased. The beads 221 are only formed on the bar body 22 except for the wide connection portions 23f and 23r on the front and rear sides of the extending direction (longitudinal direction) of the door impact bar 21, and are formed in shapes protruding to the vehicle-width-direction outer side while being spaced apart from each other in the width direction of the door impact bar 21.

As illustrated in FIG. 1 to FIG. 7, the connection reinforcement member 18 is provided on the door inner panel 12 from a lower portion of the rear edge portion 12r to a rear portion of the lower edge portion 12d. Regarding the door impact bar 21, the front wide connection portion 23f is joined to the upper hinge reinforcement 14, and the rear wide connection portion 23r is joined to the connection reinforcement member 18.

Specifically, as illustrated in FIG. 5, the rear wide connection portion 23r of the door impact bar 21 is joined to the door inner panel 12 via the connection reinforcement member 18, and the connection reinforcement member 18 reinforces a joining section between the door impact bar 21 and the door inner panel 12.

The connection reinforcement member 18 is made of a steel plate and is integrally formed by a connection reinforcement member base wall 181, a vehicle-width inner wall 182, and a vehicle-width outer wall 183.

The connection reinforcement member base wall 181 is formed in a curved manner along a corner shape from a rear portion of the lower edge portion base wall 121d to a lower portion of the rear edge portion base wall 121r in the vehicle side view so as to cover the rear portion of the lower edge portion base wall 121d and the lower portion of the rear edge portion base wall 121r.

The vehicle-width inner wall 182 extends in a vertical-wall-like shape from a vehicle-width inner end of the connection reinforcement member base wall 181 along a lower rear corner shape of the inner panel main plate portion 12a. The vehicle-width outer wall 183 extends in a vertical-wall-like shape from a vehicle-width outer end of the connection reinforcement member base wall 181 along the rear edge portion vehicle-width outer wall 122r and the lower edge portion vehicle-width outer wall 122d.

The connection reinforcement member 18 is joined to the door inner panel 12 as described above by integrally welding the vehicle-width inner wall 182 to the inner panel main plate portion 12a and integrally welding the vehicle-width outer wall 183 to the rear edge portion vehicle-width outer wall 122r and the lower edge portion vehicle-width outer wall 122d by spot welding and the like.

The door impact bar 21 is joined to the door inner panel 12 via the connection reinforcement member 18 as described above by integrally welding the flange portions 231r and 231r included on both outer sides of the rear wide connection portion 23r in the width direction to the vehicle-width outer wall 183 of the connection reinforcement member 18 by spot welding and the like.

As illustrated in FIG. 1 to FIG. 7, a reinforcement gusset 40 that connects the lower edge portion 12d of the front door 10 and a rear portion of the door impact bar 21 to each other is provided between the lower edge portion 12d and the rear portion, and the reinforcement gusset 40 functions as a tension rod that stretches between the lower edge portion 12d and the rear portion of the door impact bar 21 at the time of a side collision.

The reinforcement gusset 40 is made of a steel plate, and is integrally formed by an upper end flange portion 41, a lower end flange portion 42, and a reinforcement gusset body 43 connecting those portions to each other as illustrated in FIG. 6 to FIG. 8A and FIG. 8B.

The upper end flange portion 41 is formed to have a panel-like shape having a thickness in the vehicle width direction, and the lower end flange portion 42 is formed to have a panel-like shape having a thickness in the up-down direction.

As illustrated in FIG. 2 and FIG. 6, in the reinforcement gusset 40, the reinforcement gusset body 43 is formed to have a posture protruding to the vehicle-width-direction outer side such that the upper end flange portion 41 extending in the up-down direction is positioned to be closer to the vehicle-width-direction outer side than a vehicle-width-direction outer end of the lower end flange portion 42 extending in the vehicle width direction.

As illustrated in FIG. 7 and FIG. 8B, the reinforcement gusset 40 is formed such that the lower end flange portion 42 is close to the front side with respect to the upper end flange portion 41.

Specifically, in the reinforcement gusset 40, the lower end flange portion 42 is formed to be close to the front with respect to the upper end flange portion 41 such that a front end of the lower end flange portion 42 is positioned on the front side with respect to a front end of the upper end flange portion 41 and a rear end of the lower end flange portion 42 is positioned on the front side with respect to a rear end of the upper end flange portion 41.

As illustrated in FIG. 8A and FIG. 8B, the reinforcement gusset body 43 extends in the up-down direction so as to linearly connect a lower end 41d of the upper end flange portion 41 and a vehicle-width outer end 42d of the lower end flange portion 42 to each other. The reinforcement gusset body 43 is inclined so as to be positioned to be closer to the rear side as the reinforcement gusset body 43 approaches the upper side in the vehicle side view as illustrated in FIG. 8B, and is linearly inclined so as to be positioned to be closer to the vehicle-width-direction outer side as the reinforcement gusset body 43 approaches the upper side in a vehicle front view as illustrated in FIG. 2 and FIG. 4 to FIG. 7.

As illustrated in FIG. 3 and FIG. 5 to FIG. 8A and FIG. 8B, a plurality of (two) reinforcement beads 44 (ridgeline portions) extending along the extending direction are formed on the reinforcement gusset 40.

The reinforcement beads 44 are formed in a continuous manner from an upper end of the upper end flange portion 41 to a vehicle-width inner end of the lower end flange portion 42, in other words, over the entire length of the extending direction of the reinforcement gusset 40.

Passing portions of the upper end flange portion 41 and the reinforcement gusset body 43 in the extending direction of the reinforcement beads 44 protrude to the vehicle-width-direction inner side, and a passing portion of the lower end flange portion 42 protrudes to the upper side.

By the reinforcement beads 44, the rigidity of the reinforcement gusset 40 in the extending direction thereof is increased. In addition, when load is transmitted from the rear portion of the door impact bar 21 to the lower edge portion 12d via the reinforcement gusset 40 at the time of a side collision, the load transmission efficiency thereof is improved.

As illustrated in FIG. 1, FIG. 2, and FIG. 5 to FIG. 7, in the reinforcement gusset 40, the upper end flange portion 41 is joined to the rear portion of the door impact bar 21, in other words, a rear portion of the bar body 22 from the vehicle-width-direction inner side by welding and the like, and the lower end flange portion 42 is joined to the side of the lower edge portion base wall 121d by welding and the like.

As illustrated in FIGS. 8A and 8B, the upper end flange portion 41 is formed to have a posture inclined in a front-high rear-low shape along a direction in which the door impact bar 21 extends to be inclined in a front-high rear-low shape so as to be joinable to the door impact bar 21.

The reinforcement gusset body 43 is also formed such that the length in the up-down direction extends as the reinforcement gusset body 43 approaches the front side in accordance with a space between the door impact bar 21 inclined in a front-high rear-low shape and the horizontal lower edge portion base wall 121d in the up-down direction increasing as the space approaches the front side (see FIG. 8B). In other words, the reinforcement gusset 40 (reinforcement gusset body 43) is formed so as to be gradually taller as the reinforcement gusset 40 approaches the front side.

As illustrated in FIG. 4 to FIG. 7, a front end of the connection reinforcement member 18 is provided to extend to the front side from a joining section at which the rear wide connection portion 23r included on a rear end of the door impact bar 21 is joined to the door inner panel 12 side, in other words, a corner portion between the lower edge portion 12d and the rear edge portion 12r to a position substantially corresponding to a joining section at which the reinforcement gusset 40 is joined to the lower edge portion base wall 121d.

The lower end flange portion 42 of the reinforcement gusset 40 is joined to the lower edge portion base wall 121d via the connection reinforcement member 18 by welding and the like. As a result, the rigidity (in other words, the supporting force for supporting the tension of the reinforcement gusset 40 by the lower edge portion base wall 121d) of the joining section between the reinforcement gusset 40 and the lower edge portion base wall 121d is increased.

As illustrated in FIG. 1, the side vehicle-body structure of the vehicle of this embodiment described above includes the rear door 30 having the center pillar 35 extending in the vehicle up-down direction built in the front portion of the rear door 30, the front door 10 having the door impact bar 21 extending in the vehicle front-rear direction built in the front door 10, and the side sill 3 disposed so as to overlap with the lower portion of the center pillar 35 in the vehicle side view in the door-closed state along the lower edge of the door opening 7 formed as an opening in the vehicle body side portion so as to be closable by the rear door 30 and the front door 10. As illustrated in FIG. 1 and FIG. 3, the rear wide connection portion 23r (rear end) of the door impact bar 21 is disposed so as to overlap with the center pillar 35 in the vehicle side view. As illustrated in FIG. 1 to FIG. 7, the reinforcement gusset 40 that connects the lower portion of the front door 10 and the rear portion of the door impact bar 21 to each other is included in the door inner space 13 (inner portion) of the front door 10. As illustrated in FIG. 2, the side sill 3 is adjacently disposed below a connecting portion of the lower portion of the front door 10 at which the lower portion of the front door 10 is connected to the reinforcement gusset 40.

According to the abovementioned configuration, by causing the reinforcement gusset 40 to function as a tension member that stretches between the rear portion of the door impact bar 21 and the lower portion of the front door 10 at the time of a side collision, the lower ends of the front door 10 and the rear door 30 (hereinafter simply also referred to as "doors") can be prevented from crossing over the side sill 3 and entering the vehicle cabin.

In detail, in a general vehicle, the center pillar serving as the vehicle body strengthening member extending in the vehicle up-down direction is disposed so as to partition the door opening 7, which is for the occupant to get in and out and is formed as an opening in the vehicle body side portion, in the vehicle front-rear direction. The center pillar has an upper end integrally joined to the roof side rail 5 extending in the vehicle front-rear direction along the upper edge of the door opening 7 and an lower end integrally joined to the side sill 3 extending in the vehicle front-rear direction along the lower edge of the door opening 7, and the overlapping amount for the roof side rail 5 and the side sill 3 in the vehicle side view is also sufficiently secured.

Therefore, the doors included in the door opening 7 can be caught by the center pillar so that the doors do not enter the vehicle cabin at the time of a side collision.

Meanwhile, in a configuration in which the center pillar 35 is included on the door side instead of the vehicle body side as in this embodiment, the center pillar 35 is not directly connected to vehicle-body-side strength members such as the roof side rail 5 and the side sill 3, and the overlapping amount with the vehicle-body-side strength members in the vehicle side view in the door-closed state can only be secured within a range of the overlapping amount of the doors themselves with the vehicle body. Therefore, as side collision measures in the side vehicle-body structure including the center pillar 35 on the door side, the rear wide connection portion 23r (rear end) of the door impact bar 21 built in the front door 10 so as to extend in the vehicle front-rear direction is caused to overlap with the center pillar 35 built in the front portion of the rear door 30 in the vehicle side view.

However, when a side collision load is input to a place near an intermediate portion of the door opening 7, which is opened in the vehicle front-rear direction in a continuous manner, in the vehicle front-rear direction at the time of a side collision, the side collision load is concentrated on the center pillar 35. The side collision load to be concentrated on the center pillar 35 can be distributed to the side of the door impact bar 21 to a certain extent by causing the rear end of the door impact bar 21 to overlap with the center pillar 35 in the vehicle side view, but only a load distribution effect within the range of the front door 10 itself having the door impact bar 21 built therein can be expected.

Therefore, also in the abovementioned configuration, there is a fear that the center pillar 35 cannot catch (withstand) the doors included on the door opening 7 so that the doors do not enter the vehicle cabin at the time of a side collision.

Thus, in this embodiment, by including the reinforcement gusset 40 that connects the lower portion of the front door 10 and the rear portion of the door impact bar 21 to each other in the inner portion of the front door 10, the reinforcement gusset 40 can function as a tension member that stretches between the rear portion of the door impact bar 21 and the lower portion of the front door 10 at the time of a side collision.

In detail, in the side vehicle-body structure of the vehicle of this embodiment, (the upper wall 3Cb of) the side sill 3 extending in the vehicle front-rear direction is adjacently disposed below the lower portion of the front door 10 (see FIG. 2). Therefore, the lower portion of the reinforcement gusset 40 can stretch toward the vehicle body side, in other words, particularly the upper wall 3Cb of the side sill reinforcement 3C of the side sill 3 via the lower portion of the front door 10, in other words, the lower edge portion base wall 121d at the time of a side collision. As a result, excellent tension force can be obtained between the door impact bar 21 and the side sill 3 both formed to have high rigidity.

Therefore, the lower end (the lower edge portion vehicle-width outer wall 122d) of the door can be prevented from crossing over the side sill 3 while crashing against the side sill 3 from the vehicle-width-direction outer side and entering the vehicle cabin from the door opening 7.

In other words, as described above, in the side vehicle-body structure of the vehicle of this embodiment, the rear end of the door impact bar 21 overlaps with the center pillar 35 in the vehicle side view, and the reinforcement gusset 40 is connected to the rear portion of the door impact bar 21, in other words, a place near the center pillar 35 in the vehicle front-rear direction. The lower portion of the front door 10 and the side sill 3 are adjacently disposed on upper and lower sides such that the lower portion of the reinforcement gusset 40 can stretch to the side of the side sill 3 on the vehicle body side via the lower portion of the front door 10 at the time of a side collision.

As a result, the side vehicle-body structure of the vehicle of this embodiment can instantly distribute the load to be concentrated on the center pillar 35 at the time of a side collision to the side of the side sill 3 on the vehicle body side from the door impact bar 21 via the reinforcement gusset 40 in an efficient manner.

Therefore, the side vehicle-body structure of the vehicle of this embodiment can catch the doors by the center pillar 35 so that the doors do not enter the vehicle cabin at the time of a side collision while being a configuration including the center pillar 35 on the door (rear door 30) side instead of the vehicle body side.

As an aspect of the present disclosure, the vehicle has doors in a form of a clamshell door structure in which the front door 10 is connected to the vehicle body at a front end portion of the front door 10 via the hinge bracket 8 (hinge), the rear door 30 is connected to the vehicle body at a rear end portion of the rear door 30 via a hinge (not shown), and a front-rear length of the front door 10 is shorter than a front-rear length of the rear door 30 (see FIG. 1).

According to the abovementioned configuration, the center pillar 35 is disposed to be close to the rear side with respect to the intermediate position of the door opening 7 in the vehicle front-rear direction due to the front-rear length of the rear door 30 being shorter than the front-rear length of the front door 10. However, the reinforcement gusset 40 can make up for the negative effect at the time of a side collision due to the misalignment.

In detail, in a configuration in which the front-rear length of the rear door 30 is shorter than the front-rear length of the front door 10 as in this embodiment, the center pillar 35 built in the front portion of the rear door 30 is disposed in a position shifted from the intermediate position of the door opening 7, which is formed in the vehicle body side portion, in the vehicle front-rear direction to the rear side in the door-closed state.

As a result, the side collision load toward the inside of the vehicle cabin is easily input to the front door 10 side as compared to the rear door 30 at the time of a side collision, and hence there is a fear that it becomes difficult to catch the side collision load by the center pillar 35 included on the rear door 30 side.

Meanwhile, in this embodiment, the reinforcement gusset 40 is connected to the rear portion of the door impact bar 21 built in the front door 10 extending in the vehicle front-rear direction, and hence the reinforcement gusset 40 can make up for the decrease in the ability of catching the front door 10 by the center pillar 35 when the side collision load is input to the front door 10 at the time of a side collision.

As an aspect of the present disclosure, the reinforcement gusset 40 is provided such that the upper end flange portion 41 (upper end) side thereof is positioned on the vehicle outer side with respect to the lower end flange portion 42 (lower end) side thereof (see FIG. 2, FIG. 6, and FIG. 7).

According to the abovementioned configuration, the side collision load toward the inside of the vehicle cabin is input to the doors at the time of a side collision. As a result, the door impact bar 21 is pushed to the inside of the vehicle cabin. Therefore, the tension force of the reinforcement gusset 40 against the door lower portion, in other words, the lower edge portion base wall 121d can be increased.

In detail, in accordance with the door impact bar 21 being pushed to the inside of the vehicle cabin when the side collision load toward the inside of the vehicle cabin is input to the doors at the time of a side collision, the reinforcement gusset 40 is biased by the door impact bar 21 so that the upper end flange portion 41 side is displaced to the vehicle-width-direction inner side.

At this time, the reinforcement gusset 40 is biased so as to be gradually changed from a posture (a posture inclined in a shape in which the upper side is on the outer side and the lower side is on the inner side in the vehicle front view) as that illustrated in FIG. 2 in which the upper end flange portion 41 side is positioned on the vehicle-width-direction outer side with respect to the lower end flange portion 42 side to a rising (erect) posture, in other words, such that the length component in the vehicle up-down direction becomes longer.

Therefore, the reinforcement gusset 40 can increase the tension force (pressing down force) against the lower edge portion base wall 121d as the door impact bar 21 is pushed into the vehicle-width-direction inner side by the side collision load.

Therefore, the lower edge portion base wall 121d of the front door 10 can be pushed by the reinforcement gusset 40 to the side of the side sill 3 such that the lower end portion (the lower edge portion vehicle-width outer wall 122d) of the door does not cross over the side sill 3.

As an aspect of the present disclosure, the front door 10 includes the door inner panel 12 (door inner) to which the rear wide connection portion 23r (rear end) of the door impact bar 21 is connected, and the connection reinforcement member 18 that is interposed between the rear wide connection portion 23r of the door impact bar 21 and the door inner panel 12 and reinforces the connection section between the rear wide connection portion 23r of the door impact bar 21 and the door inner panel 12 as illustrated in FIG. 1 to FIG. 7, the door inner panel 12 includes the lower edge portion base wall 121d (door lower portion) to which the reinforcement gusset 40 is connected as illustrated in FIG. 2, FIG. 5, and FIG. 6, the connection reinforcement member 18 is extended to the connecting section of the lower edge portion base wall 121d at which the lower edge portion base wall 121d is connected to the reinforcement gusset 40 (see FIG. 4 to FIG. 7), and the reinforcement gusset 40 is connected to the lower edge portion base wall 121d via the connection reinforcement member 18.

According to the abovementioned configuration, the reinforcement gusset 40 is connected to the lower edge portion base wall 121d via the connection reinforcement member 18, and hence the rigidity of the lower edge portion base wall 121d side to which the lower portion of the reinforcement gusset 40 is connected can be increased and the tension force of the reinforcement gusset 40 can be improved.

By improving the rigidity of the connecting section in the lower edge portion base wall 121d at which the lower edge portion base wall 121d is connected to the reinforcement gusset 40 by the connection reinforcement member 18, the ability of transmitting the side collision load to be transmitted from the reinforcement gusset 40 to the side of the side sill 3 via the lower edge portion base wall 121d side reinforced by the connection reinforcement member 18 at the time of a side collision can also be improved.

Therefore, the load to be concentrated on the center pillar 35 at the time of a side collision can be even more efficiently distributed from the door impact bar 21 to the side of the side sill 3 on the vehicle body side via the reinforcement gusset 40.

As an aspect of the present disclosure, the reinforcement gusset 40 includes the plurality of reinforcement beads 44 (ridgeline portions) extending in the longitudinal direction (see FIG. 7 and FIG. 8A).

According to the abovementioned configuration, the rigidity of the reinforcement gusset 40 itself against the tension can be increased by increasing the rigidity of the reinforcement gusset 40 in the longitudinal direction by the reinforcement beads 44 while suppressing the increase of weight by forming the reinforcement gusset 40 in a plate-like shape.

The reinforcement gusset 40 includes the plurality of reinforcement beads 44 extending in the longitudinal direction, and hence the transmission efficiency of the side collision load from the door impact bar 21 to the lower edge portion base wall 121d can also be increased via the reinforcement gusset 40.

As an aspect of the present disclosure, the reinforcement gusset 40 is formed such that the lower end flange portion 42 (lower end) is positioned on the front side with respect to the upper end flange portion 41 (upper end) (see FIG. 1, FIG. 7, and FIG. 8B).

According to the abovementioned configuration, as compared to when the reinforcement gusset 40 is formed such that upper and lower ends thereof are in substantially same positions in the vehicle front-rear direction, for example, the lower portion of the reinforcement gusset 40 can be connected to a position in the lower edge portion base wall 121d separated more from the center pillar 35 to the front side.

As a result, the side collision load that is input toward the inside of the vehicle cabin to be input to the rear portion of the door impact bar 21 and the center pillar 35 at the time of a side collision can be received by a wide range across the vehicle front-rear direction of the side sill 3.

In particular, in a configuration in which the front-rear length of the front door 10 is longer than the front-rear length of the rear door 30 as in this embodiment, the center pillar 35 built in the front portion of the rear door 30 is disposed to be close to the rear side with respect to the center of the door opening 7 in the vehicle front-rear direction as described above.

This point also contributes to further expansion of the space between the portion in the side sill 3 overlapping with the lower portion of the center pillar 35 and the portion directly below the lower portion of the reinforcement gusset 40 in the vehicle front-rear direction. Therefore, the input load toward the inside of the vehicle cabin that is input to the rear portion of the door impact bar 21 and the center pillar 35 the time of a side collision can be received in a wider area of the side sill 3 as a result.

As an aspect of the present disclosure, the door impact bar 21 has a structure in which the rear wide connection portion 23r (rear end) of the door impact bar 21 overlaps with the lower portion of the center pillar 35 in the vehicle side view (see FIG. 1 and FIG. 3).

According to the abovementioned configuration, (the length in the up-down direction of) the reinforcement gusset 40 that connects the lower portion of the front door 10 and the rear portion of the door impact bar 21 to each other in the up-down direction can be shortened, and the improvement of the flexural rigidity and the weight saving of the reinforcement gusset 40 can be contributed to as a result.

The present disclosure is not limited to the configuration of the embodiment described above and can be formed by various embodiments.

What is claimed is:

1. A side vehicle-body structure of a vehicle, the side vehicle-body structure comprising:
    a rear door having a center pillar extending in a vehicle up-down direction built in a front portion of the rear door;
    a front door having a door impact bar extending in a vehicle front-rear direction built in the front door; and
    a side sill disposed to overlap with a lower portion of the center pillar in a vehicle side view in a door-closed state along a lower edge of a door opening formed as an opening in a vehicle body side portion so as to be closable by the rear door and the front door, wherein
    a rear end of the door impact bar is disposed to overlap with the center pillar in the vehicle side view,
    a reinforcement gusset that connects a lower portion of the front door and a rear portion of the door impact bar to each other is included in an inner portion of the front door, and
    the side sill is adjacently disposed below a connecting portion of the lower portion of the front door at which the lower portion of the front door is connected to the reinforcement gusset,
    wherein
    the front door includes a door inner to which a rear end of the door impact bar is connected, and a connection reinforcement member that is interposed between the rear end of the door impact bar and the door inner and reinforces a connection section between the rear end of the door impact bar and the door inner,
    the door inner includes the lower portion of the front door to which the reinforcement gusset is connected,
    the connection reinforcement member is extended to a connecting section of the lower portion of the front door at which the lower portion of the front door is connected to the reinforcement gusset, and
    the reinforcement gusset is connected to the lower portion of the front door via the connection reinforcement member.

2. The side vehicle-body structure of the vehicle according to claim 1, wherein
    the vehicle has doors in a form of a clamshell door structure in which the front door is connected to a vehicle body at a front end portion of the front door via a hinge,
    the rear door is connected to the vehicle body at a rear end portion of the rear door via a hinge, and
    a front-rear length of the rear door is shorter than a front-rear length of the front door.

3. The side vehicle-body structure of the vehicle according to claim 2, wherein
    the reinforcement gusset is provided such that an upper end side thereof is positioned on a vehicle outer side with respect to a lower end side thereof.

4. The side vehicle-body structure of the vehicle according to claim 3, wherein
    the reinforcement gusset includes a plurality of ridgeline portions extending in a longitudinal direction.

5. The side vehicle-body structure of the vehicle according to claim 4, wherein
    the reinforcement gusset is formed such that a lower end thereof is positioned on a front side with respect to an upper end thereof.

6. The side vehicle-body structure of the vehicle according to claim 5, wherein
    the door impact bar has a structure in which a rear end of the door impact bar overlaps with a lower portion of the center pillar in the vehicle side view.

7. The side vehicle-body structure of the vehicle according to claim 1, wherein
    the reinforcement gusset is provided such that an upper end side thereof is positioned on a vehicle outer side with respect to a lower end side thereof.

8. The side vehicle-body structure of the vehicle according to claim 1, wherein
    the reinforcement gusset includes a plurality of ridgeline portions extending in a longitudinal direction.

9. The side vehicle-body structure of the vehicle according to claim 1, wherein
    the reinforcement gusset is formed such that a lower end thereof is positioned on a front side with respect to an upper end thereof.

10. The side vehicle-body structure of the vehicle according to claim 1, wherein
    the door impact bar has a structure in which a rear end of the door impact bar overlaps with a lower portion of the center pillar in the vehicle side view.

11. The side vehicle-body structure of the vehicle according to claim 2, wherein
    the reinforcement gusset includes a plurality of ridgeline portions extending in a longitudinal direction.

12. The side vehicle-body structure of the vehicle according to claim 2, wherein
    the reinforcement gusset is formed such that a lower end thereof is positioned on a front side with respect to an upper end thereof.

13. The side vehicle-body structure of the vehicle according to claim 2, wherein
    the door impact bar has a structure in which a rear end of the door impact bar overlaps with a lower portion of the center pillar in the vehicle side view.

14. The side vehicle-body structure of the vehicle according to claim 8, wherein
    the reinforcement gusset is provided such that an upper end side thereof is positioned on a vehicle outer side with respect to a lower end side thereof.

15. The side vehicle-body structure of the vehicle according to claim 7, wherein
the reinforcement gusset includes a plurality of ridgeline portions extending in a longitudinal direction.

16. The side vehicle-body structure of the vehicle according to claim 7, wherein
the reinforcement gusset is formed such that a lower end thereof is positioned on a front side with respect to an upper end thereof.

* * * * *